United States Patent [19]

Kohora et al.

[11] Patent Number: 4,647,550

[45] Date of Patent: Mar. 3, 1987

[54] CATALYST COMPONENT FOR POLYMERIZATION OF OLEFINS

[75] Inventors: Tadanao Kohora, Kanagawa; Satoshi Ueki; Mamoru Tachikawa, both of Saitama; Chihiro Imai, Kanagawa; Tokuo Makishima, deceased, late of Saitama, all of Japan, Nobuko Makishima, legal representative

[73] Assignee: Toa Nenryo Kogyo Kabushiki Kaisha, Tokyo, Japan

[21] Appl. No.: 761,242

[22] Filed: Jul. 31, 1985

[30] Foreign Application Priority Data

Jul. 31, 1984 [JP] Japan .................................. 59-159119

[51] Int. Cl.$^4$ .............................................. C08F 4/64
[52] U.S. Cl. .................................... 502/115; 502/112; 502/113; 502/119; 502/120; 502/121; 502/122; 502/123; 502/124; 502/125; 502/126; 502/127; 526/142; 526/143

[58] Field of Search ............... 502/112, 113, 115, 119, 502/120, 121–127

[56] References Cited

U.S. PATENT DOCUMENTS

| | | | |
|---|---|---|---|
| 4,378,304 | 3/1983 | Dombro | 502/120 X |
| 4,419,269 | 12/1983 | Schell | 502/125 X |
| 4,468,477 | 8/1984 | Caunt et al. | 502/119 X |
| 4,496,660 | 1/1985 | Gessell et al. | 502/125 X |

FOREIGN PATENT DOCUMENTS 44635  1/1982  European Pat. Off. ............ 502/152

Primary Examiner—Patrick P. Garvin
Attorney, Agent, or Firm—Myron B. Kurtzman

[57] ABSTRACT

A catalyst component for the polymerization of olefins which is prepared by contacting a contact reaction product of (a) a metal oxide, (b) an organic magnesium compound, and (c) an alkoxy group-containing compound held in contact with (d) a titanium compound.

11 Claims, No Drawings

CATALYST COMPONENT FOR POLYMERIZATION OF OLEFINS

DETAILED DESCRIPTION OF THE INVENTION

Field of the Invention

This invention relates to a catalyst component for the polymerization of olefins.

BACKGROUND OF THE INVENTION

Concerning Ziegler-Natta type catalysts which are effective in polymerizing olefins, catalyst components having transition metals deposited on various kinds of carriers have been developed for the purpose of improving catalyst activity per unit amount of catalyst or decreasing residues originating in catalyst and persisting in produced polymer.

Heretofore various methods have been tried for the preparation of catalyst components which have inorganic carriers such as silica and alumina held in contact with organic magnesium compounds and further have titanium halide compounds held in contact therewith. The catalyst components obtained by these conventional methods suffer from insufficient catalytic activity as their salient disadvantage.

Recently, a catalyst component obtained by causing hydrocarbyloxysilane to react upon a reaction product of a porous carrier such as silica and an alkyl magnesium compound and subsequently causing a titanium halide compound to react upon the resultant reaction product (U.S. Pat. No 4,335,016 assigned to Chemplex) and a catalyst component obtained by causing an organic metal compound to react upon a porous carrier, causing a hydrocarbyl alcohol to react upon the resultant reaction product, and then causing a titanium halide compound to react on the reaction product (U.S. Pat. No. 4,378,304 and 4,458,058, each assigned to Chemplex) have been proposed. Although these catalyst components exhibit improved catalytic activity, the polymers obtained by their use have insufficient bulk density and are therefore not desirable.

SUMMARY OF THE INVENTION

This invention aims to provide a solid catalyst component which, in the polymerization of olefins exhibits high activity and enables production of an olefin polymer possessing high bulk density. After a diligent study, the inventors have found that a catalyst component which is prepared by contacting a contact reaction product of a metal oxide, an organic magnesium compound, and a specific alkoxy group-containing compound with a titanium compound accomplishes the object of this invention.

To be specific, this invention essentially concerns a catalyst component for the polymerization of olefins, which is prepared by contacting a contact reaction product of (a) a metal oxide, (b) an organic magnesium compound, and (c) an alkoxy group-containing compound held in contact with (d) a titanium compound.

Raw Materials for Preparation of Catalyst Component

(A) Metal Oxide

The metal oxide to be used in this invention is the oxide of an element selected from the class of elements belonging to Groups II through IV in the Periodic Table of Elements. Examples of the oxides are $B_2O_3$, $MgO$, $Al_2O_3$, $SiO_2$, $CaO$, $TiO_2$, $ZnO$, $ZrO_2$, $SnO_2$, $BaO$, and $ThO_2$. Among other oxides enumerated above, $B_2O_3$, $MgO$, $Al_2O_3$, $SiO_2$, $TiO_2$, and $ZrO_2$ are more desirable selections, and $SiO_2$ is the most desirable selection. Further, composite oxides including these metal oxides are also usable. Examples of these composite oxides are $SiO_2$-$MgO$, $SiO_2$-$Al_2O_3$, $SiO_2$-$TiO_2$, $SiO_2$-$V_2O_5$, $SiO_2$-$Cr_2O_3$, and $SiO_2$-$TiO_2$-$MgO$.

The aforementioned metal oxide or composite oxide described above is fundamentally desired to be an anhydride. It, however, tolerates inclusion of a hydroxide in a very small amount normally entrained in the metal oxide of the class under discussion. It also tolerates inclusion therein of impurities to an extent incapable of appreciably impairing the nature of metal oxide. Examples of the impurities so tolerated are oxides, carbonates, sulfates, and nitrates such as sodium oxide, potassium oxide, lithium oxide, sodium carbonate, potassium carbonate, calcium carbonate, magnesium carbonate, sodium sulfate, aluminum sulfate, barium sulfate, potassium nitrate, magnesium nitrate, and aluminum nitrate.

The metal oxide of the foregoing description is desired to be used in the form of a powder having an X-ray diffraction image of large width or an amorphous and minimally crystalline texture. The size and shape of the individual particles of this powder are desired to be suitably adjusted because they often have bearing on the shape of the olefin polymer to be produced. The powder is required to have as large a specific surface area, pore volume, and average pore radius as possible to suit its purpose. Prior to use, this metal oxide is fired at as high a temperature as permissible for the purpose of expelling poisoned substance and then handled so as not to be exposed directly to the atmosphere.

(B) Organic Magnesium Compound

The organic magnesium compound to be used in the present invention is represented by the general formula RMgR'. In this formula, R denotes a hydrocarbon group (alkyl, cycloalkyl, aryl, and aralkyl) of 1 to 20 carbon atoms and R' denotes a hydrocarbon group (alkyl, cycloalkyl, aryl, and aralkyl) of 1 to 20 carbon atoms or a halogen atom.

Examples of the organic magnesium compound, where R and R' both denote hydrocarbon groups, are dimethyl magnesium (hereinafter "magnesium" will be abbreviated as "Mg"), diethyl Mg, ethylmethyl Mg, dipropyl Mg, diisopropyl Mg, ethylpropyl Mg, dibutyl Mg, diisobutyl Mg, di-sec-butyl Mg, di-tert-butyl Mg, butylethyl Mg, butylpropyl Mg, sec-butylethyl Mg, tert-butylisopropyl Mg, sec-butyl-tert-butyl Mg, dipentyl Mg, diisopentyl Mg, ethylpentyl Mg, isopropylpentyl Mg, sec-butylpentyl Mg, dihexyl Mg, ethylhexyl Mg, butylhexyl Mg, tertbutylhexyl Mg, (2-ethylbutyl)ethyl Mg, (2,2-diethylbutyl)ethyl Mg, diheptyl Mg, dioctyl Mg, di-2-ethylhexyl Mg, didecyl Mg, dicyclohexyl Mg, cyclohexylethyl Mg, butylcyclohexyl Mg, di(methylcyclohexyl) Mg, diphenyl Mg, ethylphenyl Mg, butylphenyl Mg, sec-butylphenyl Mg, ditolyl Mg, ethyltolyl Mg, dixylyl Mg, dibenzyl Mg, benzyl-tert-butyl Mg, diphenethyl Mg, and ethylphenethyl Mg.

The organic magnesium compound may be a mixture or complex compound with an organic compound of other metals. The organic compound of other metals is represented by the general formula MRn (wherein M denotes boron, beryllium, aluminum or zinc, R denotes an alkyl, cycloalkyl, aryl, or aralkyl group of 1 to 20 carbon atoms, and n denotes the valency of the metal M). Concrete examples of the organic compound of other metals are triethyl aluminum, tributyl aluminum, triisobutyl aluminum, triphenyl aluminum, triethyl boron, tributyl boron, diethyl beryllium, diisobutyl beryllium, diethyl zinc, and dibutyl zinc.

In the aforementioned mixture or complex compound, the ratio of the organic magnesium compound to the organic compound of other metals generally is such that the amount of the other metals are not more than 2 gram atoms, preferably not more than 1 gram atom, per gram atom of magnesium.

Examples of the organic magnesium compound, where R denotes a hydrocarbyl group and R' denotes a halogen atom, are methyl magnesium chloride (hereinafter magnesium chloride will be abbreviated as MgCl, magnesium bromide as MgBr, and Magnesium iodide as MgI respectively), ethyl MgCl, propyl MgCl, isopropyl MgCl, butyl MgCl, isobutyl MgCl, sec-butyl MgCl, tert-butyl MgCl, pentyl MgCl, hexyl MgCl, 2-ethylhexyl MgCl, octyl MgCl, decyl MgCl, cyclohexyl MgCl, methylcyclohexyl MgCl, phenyl MgCl, tolyl MgCl, xylyl MgCl, benzyl MgCl, ethyl MgBr, isopropyl MgBr, butyl MgBr, sec-butyl MgBr, tert-butyl MgBr, hexyl MgBr, octyl MgBr, cyclohexyl MgBr, phenyl MgBr, ethyl MgI, butyl MgI, isobutyl MgI, sec-butyl MgI, 2-ethylhexyl MgI, and phenyl MgI.

(C) Alkoxy Group-Containing Compound

The alkoxy group-containing compound to be used in the present invention is represented by the general formula $X_mC(OR)_{4-m}$. In the formula, X denotes a hydrogen atom, a halogen atom, a hydrocarbon group (alkyl, cycloalkyl, aryl, or aralkyl) of 1 to 20 carbon atoms, or a halogen-substituted hydrocarbon group of the same description as above, R denotes a hydrocarbyl group such as an alkyl, cycloalkyl, aryl, or aralkyl group of 1 to 20 carbon atoms, and m denotes a numeral of the value of 0, 1, or 2. For illustrative purposes, examples of the alkoxy group-containing compound, wherein m denotes 0, 1, and 2, will be cited below.

Where m is 0, the general formula $C(OR)_4$ represents orthocarbonic esters which have methyl, ethyl, propyl, butyl, isobutyl, sec-butyl, hexyl, octyl, cyclohexyl, phenyl, etc. as the substituent R.

Where m is 1, the general formula $XC(OR)_3$ represents orthoformic esters which have a hydrogen atom as the substituent X and methyl, ethyl isopropyl, butyl, hexyl, octyl, nonyl, cyclohexyl, phenyl, etc. as the substituent R; ortho-methyl acetate, ortho-ethyl acetate, ortho-methyl propionate, ortho-butyl propionate, $C_6H_{11}C(OC_2H_5)_3$, $C_6H_5C(OCH_3)_3$, $C_6H_5C(OC_2H_5)_3$, $C_6H_5C(OC_3H_7)_3$, $C_7H_7C(OC_2H_5)_3$, and $C_8H_9C(OC_2H_5)_3$ which have hydrocarbon groups as the substituent X; ortho-ethylbromoacetate, ortho-ethyl chloroacetate, ortho-ethyl alpha-bromopropionate, orthoethyl alpha-chloropropionate, etc. which have halogen-substituted hydrocarbon groups as the substituent X; and ortho-methyl chloroformate, ortho-ethyl chloroformate, ortho-propyl chloroformate, ortho-isobutyl chloroformate, ortho-octyl chloroformate, ortho-phenyl chloroformate, ortho-ethyl bromoformate, etc. which have halogen atoms as the substituent X.

Where m is 2, the general formula $X_2C(OR)_2$ represents ethylidene dimethyl ether, ethylidene diethyl ether, methylal, methylene diethyl ether, monochloroacetal, dichloroacetal, trichloroacetal, monobromoacetal, monoiodoacetal, benzaldehyde diethyl acetal, etc.

In the compounds enumerated above, ortho-carbonic esters and ortho-formic esters are desirable selections and ortho-formic esters such as ortho-methyl formate, ortho-ethyl formate, and ortho-butyl formate which have 1 to 8 carbon atom are more desirable selections.

(D) Titanium Compound

Titanium compounds are divalent, trivalent, and tetravalent titanium compounds. Concrete examples of such titanium compounds are titanium tetrachloride, titanium tetrabromide, trichlorethoxy titanium, trichlorobutoxy titanium, dichlorodiethoxy titanium, dichlorodibutoxy titanium, dichlorodiphenoxy titanium, chlorotriethoxy titanium, chlorotributoxy titanium, tetrabutoxy titanium, and titanium trichloride. Among other titanium compounds enumerated above, tetravalent titanium halides such as titanium tetrachloride, trichloroethoxy titanium, dichlorodibutoxy titanium, and dichlorodiphenoxy titanium prove desirable and titanium tetrachloride proves particularly desirable.

Method for Preparation of Catalyst Component

The catalyst component of the present invention is obtained by contacting a contact reaction product of the metal oxide (hereinafter referred to as "A component"), the organic magnesium compound (hereinafter referred to as "B component"), and the alkoxy group-containing compound (hereinafter referred to as "C component") held in contact with the titanium compound (hereinafter referred to as "D component").

Contact of A Component, B Component, and C Component

The contact of A component, B component and C component is effected by (1) a procedure of first establishing contact between A component and B component and then introducing C component into contact therewith, (2) a procedure of first establishing contact between A component and C component and then introducing B component into contact thereof, (3) a procedure of first establishing contact between B component and C component and then introducing A component into contact therewith, or (4) a procedure of establishing contact among A component, B component and C component all at once.

The contact mentioned above is effected by stirring the relevant components in the presence or absence of an inactive medium or by mechanically comminuting the relevant components jointly, for example. Examples of the inactive medium usable in the contact are hydrocarbons such as pentane, hexane, heptane, octane, decane, cyclohexane, benzene, toluene, and xylene and halides of hydrocarbons such as 1,2-dichloroethane, 1,2-dichloropropane, carbon tetrachloride, butyl chloride, isoamyl chloride, bromobenzene, and chlorotoluene.

The contact of A component, B component and C component is generally carried out at a temperature of $-20°$ C. to $+150°$ C. for a period of 0.1 to 100 hours, preferably room temperature to 110° C. for 0.5 to 10 hours. Where the contact entails evolution of heat, there may be adopted a procedure of first mixing the components gradually at a low temperature and, after all the components have been wholly mixed, elevating the temperature and continuing the contact. Further during the course of the contact of the components, the individual components may be washed with the aforementioned inactive medium. The proportions in which A component, B component, and C component are used in the contact are such that the ratio A/B=1 g/1.0~100 mmols, preferably 1 g/1~10 mmols, the ratio of A/C=1 g/2~100 mmols, preferably 1 g/10~50 mmols, and the mol ratio of C/B=0.05~100, preferably 0.1~50.

The solid product obtained by the contact of the A component, the B component, and the C component (hereinafter referred to as "reaction product I") is subjected to the subsequent contact. Optionally, the reaction product I may be cleaned with a suitable cleaning agent such as, for example, the aforementioned inactive medium.

In accordance with the present invention, the reaction product I obtained as described above is set into contact with the D component (titanium compound). Optionally, the reaction product I may be brought into contact with a halogen-containing compound, an electron-donating compound, and/or an organic aluminum compound prior to or subsequently to the contact thereof with the D component.

Examples of the halogen-containing compound are halogen compounds of metallic and non-metallic elements such as $SiCl_4$, $SnCl_4$, $AlCl_3$, $BCl_3$, $SbCl_5$, $BI_3$, $PCl_3$, $PCl_5$, and $HSiCl_3$; hydrogen halides such as HCl, HBr, and HI; oxyhalides of non-metallic elements such as $SO_2Cl_2$, $SOCl_2$, NOCl, and $POCl_3$; halogen elements such as $Cl_2$ and $Br_2$; and halides of hydrocarbons such as carbon tetrachloride, 1,2-dichloroethane, 1,1,2-trichlorethylene, hexachloroethane, 1,2-di-chloropropane, octachlorobutane, hexachlorocyclohexane, dichlorobenzene, and hexachlorobenzene.

Examples of the electron-donating compound are carboxylic acids, carboxylic anhydrides, carboxylic esters, carboxylic halides, alcohols, ethers, ketones, amines, amides, nitriles, aldehydes, alcoholates, phosphorus, bismuth, and antimony compounds linked with organic groups through the medium of carbon or oxygen atoms, phosphamides, thioethers, thioesters, and carbonic esters. Among other electron-donating compounds cited above, carboxylic acids, carboxylic anhydrides, carboxylic esters, carboxylic halides, alcohols, and ethers are particularly desirable.

Concrete examples of the carboxylic acids are aliphatic monocarboxylic acids such as formic acid, acetic acid, propionic acid, butyric acid, isobutyric acid, valeric acid, caproic acid, pivalic acid, acrylic acid, methacrylic acid, and crotonic acid, aliphatic dicarboxylic acids such as malonic acid, succinic acid, glutaric acid, adipic acid, sebacic acid, maleic acid, and fumaric acid, aliphatic oxycarboxylic acids such as tartaric acid, alicyclic carboxylic acids such as cyclohexane monocarboxylic acids, cyclohexene monocarboxylic acids, cis-1,2-cyclohexane dicarboxylic acids, and cis-4-methylcyclohexane-1,2-dicarboxylic acids, aromatic monocarboxylic acids such as benzoic acid, toluic acid, anisic acid, p-tert-butyl-benzoic acid, naphthoic acid, and cinnamic acid, and aromatic dicarboxylic acids such as phthalic acid, isophthalic acid, terephthalic acid, and naphthalic acid.

Concrete examples of carboxylic anhydrides are the anhydrides of the carboxylic acids enumerated above.

Carboxylic esters are monoesters and diesters of the carboxylic acids enumerated above. Concrete examples of such monoesters and diesters are butyl formate, ethyl acetate, butyl acetate, isobutyl isobutyrate, propyl pivalate, isobutyl pivalate, ethyl acrylate, methyl methacrylate, ethyl methacrylate, isobutyl methacrylate, diethyl malonate, diisobutyl malonate, diethyl succinate, dibutyl succinate, diisobutyl succinate, diethyl glutarate, dibutyl glutarate, diisobutyl glutarate, diisobutyl adipate, dibutyl sebacate, diethyl maleate, dibutyl maleate, diisobutyl maleate, monomethyl fumarate, diethyl fumarate, diisobutyl fumarate, diethyl tartrate, dibutyl tartrate, diisobutyl tartrate, ethyl cyclohexane-carboxylates, methyl benzoate, ethyl benzoate, methyl p-toluate, ethyl p-tert-butylbenzoate, ethyl p-anisate, ethyl alpha-naphthoate, isobutyl alphanaphthoate, ethyl cinnamate, monomethyl phthalate, dibutyl phthalate, diisobutyl phthalate, dihexyl phthalate, dioctyl phthalate, di-2-ethylhexyl phthalate, diallyl phthalate, diphenyl phthalate, diethyl isophthalate, diisobutyl isophthalate, diethyl terephthalate, dibutyl terephthalate, diethyl naphthalate, and dibutyl naphthalate.

Carboxylic halides are halides of the carboxylic acids enumerated above. Concrete examples of such halides are acetic acid chloride, acetic acid bromide, acetic acid iodide, propionic acid chloride, butyric acid chloride, butyric acid bromide, butyric acid iodide, pivalic acid chloride, pivalic acid bromide, acrylic acid chloride, acrylic acid bromide, acrylic acid iodide, methacrylic acid chloride, methacrylic acid bromide, methacrylic acid iodide, crotonic acid chloride, maloic acid chloride, maloic acid bromide, succinic acid chloride, succinic acid bromide, glutaric acid chloride, glutaric acid bromide, adipic acid chloride, adipic acid bromide, sebacic acid chloride, sebacic acid bromide, maleic acid chloride, maleic acid bromide, fumaric acid chloride, fumaric acid bromide, tartaric acid chloride, tartaric acid bromide, cyclohexane-carboxylic acid chloride, cyclohexane-carboxylic acid bromides, 1-cyclohexene-carboxylic acid chloride, cis-4-methylcyclohexene-carboxylic acid chloride, cis-4-methylcyclohexene-carboxylic acid bromide, benzoyl chloride, benzoyl bromide, p-toluic acid chloride, p-toluic acid bromide, p-anisic acid chloride, p-anisic acid bromide, alpha-naphthoic acid chloride, cinnamic acid chloride, cinnamic acid bromide, phthalic acid dichloride, phthalic acid dibromide, isophthalic acid dichloride, isophthalic acid dibromide, terephthalic acid dichloride, and naphthalic acid dichloride. Further monoalkyl halides of dicarboxylic acids such as adipic acid monomethyl chloride, maleic acid monoethyl chloride and maleic acid monomethyl chloride are also usable.

Alcohols are represented by the general formula ROH. In the formula, R denotes an alkyl, alkenyl, cycloalkyl, aryl, or aralkyl group of 1 to 12 carbon atoms. Concrete examples of such alcohols are methanol, ethanol, propanol, isopropanol, butanol, isobutanol, pentanol, hexanol, octanol, 2-ethylhexanol, cyclohexanol, benzyl alcohol, allyl alcohol, phenol, cresol, xylenol, ethyl phenol, isopropyl phenol, p-tertiary butyl phenol, and n-octyl phenol. Ethers are represented by the general formula ROR'. In the formula, R and R' each denote an alkyl, alkenyl, cycloalkyl, aryl, or aralkyl group of 1 to 12 carbon atoms, providing that R and R' may be equal to or different from each other. Concrete examples of such ethers are diethyl ether, diisopropyl ether, dibutyl ether, diisobutyl ether, diisoamyl ether, di-2-ethylhexyl ether, diallyl ether, ethylallyl ether, butylallyl ether, diphenyl ether, anisol, and ethylphenyl ether.

Examples of the organic aluminum compound are triethyl aluminum, triisobutyl aluminum, diethyl aluminum chloride, ethyl aluminum chloride, and tri-n-hexyl aluminum.

The contact of the reaction product I with the halogen-containing compound, the electron-donating compound and/or the organic aluminum compound (hereinafter referred to as "E component") which is optionally made is effected by stirring all the components in the presence of an inactive medium. The inactive medium used herein may be the same compound as effectively used in the contact of the A component, the B component, and the C component.

The contact of the reaction product I with the E component is generally effected at a temperature in the range of 0° to 150° C. for a period in the range of 0.5 to 10 hours. The E component is desired to be used in an amount falling in the range of 0.005 to 10 gram mols, preferably 0.01 to 1 gram mol, per gram atom of magnesium present in the reaction product I. The reaction product I which has been held in contact with the E component may be washed with the aforementioned inactive medium prior to the contact thereof with the D component.

Contact with the D Component

The contact between the D component and the reaction product I which has or has not undergone the contact with the E component is effected by mechanically mixing the two components by joint comminution or agitation in the presence or absence of an inactive medium. Preferably, this contact is desired to be effected by joint agitation of the components in the presence of the inactive medium. The inactive medium used herein may be any of the compounds enumerated above.

The proportions of the reaction product I and the D component to be used in the contact are such that the amount of the D component is required to exceed 0.01 gram mol and desired to fall in the range of 0.1 to 10 gram mols per gram atom of magnesium in the reaction product I. The contact of these two components, when effected by agitation in the presence of the inactive medium, is carried out at a temperature of 0° to 200° C. for 0.5 to 24 hours, preferably at 60° to 150° C. for one to five hours.

The contact between the reaction produced I and the D component may be carried out twice or more. This contact can be effected by any of the procedures mentioned above. In this case, the product from the former contact may be cleaned with an inactive medium and the cleaned product allowed to contact with a freshly added portion of the D component (in conjunction with the aforementioned medium).

The contact reaction product obtained as described above is cleaned, when necessary, with hydrocarbon such as hexane, heptane, octane, cyclohexane, benzene, toluene, or xylene, and then dried to give birth to the catalyst component of the present invention.

The catalyst component of the present invention is formed of particles having a specific surface area in the range of 10 to 1,000 m$^3$/g and a pore volumes in the range of 0.05 to 5 cm$^3$/g as measured by the BET method at the adsorption temperature of liquefied nitrogen and possessing diameters so uniform as to be distributed in a narrow range. As to the percentage composition, this catalyst component comprises 25 to 45% by weight of the metallic atom of the metal oxide (A component), 1 to 5% by weight of magnesium atom, 0.5 to 5% by weight of titanium atom, 10 to 20% by weight of halogen atom, and contains organic compound. When the preparation of the catalyst component has involved use of the electron-donating compound, this electron-donating compound is generally contained therein.

Catalyst for Polymerization of Olefins

The catalyst component of the present invention is used, as combined with an organic compound of a metal selected from the class of metals belonging to Groups I through III in the Periodic Table of Elements, for catalyzing the homopolymerization of an olefin or the copolymerization of the olefin with other olefin.

Organic compound of Metal of Group I through III

Examples of the organic metal compound usable in combination with the catalyst component are organic compounds of lithium, magnesium, calcium, zinc, and aluminum. Among other organic metal compounds just mentioned, organic aluminum compounds prove particularly desirable. The organic aluminum compounds usable herein are represented by the general formula $R_nAlX_3$ (wherein R denotes an alkyl group or an aryl group, X denotes a halogen atom, an alkoxy group, or a hydrogen atom, and n denotes a desired number in the range of $1 \leq n \leq 3$). Particularly desirable examples of the organic aluminum compound are alkyl aluminum compounds such as trialkyl aluminum, dialkyl aluminum monohalide, monoalkyl aluminum dihalide, alkyl aluminum sesquihalide, dialkyl aluminum monoalkoxide, and dialkyl aluminum monohydride, respectively having 1 to 18 carbon atoms, preferably 2 to 6 carbon atoms, and mixtures and complex compounds thereof. Concrete examples of such organic aluminum compounds are trialkyl aluminums such as trimethyl aluminum, triethyl aluminum, tripropyl aluminum, triisobutyl aluminum, and trihexyl aluminum, dialkyl aluminum monohalides such as dimethyl aluminum chloride, diethyl aluminum iodide, and diisobutyl aluminum chloride, Monoalkyl aluminum dihalides such as methyl aluminum dichloride, ethyl aluminum dibromide, ethyl aluminum diiodide, and isobutyl aluminum dichloride, alkyl aluminum sesquihalides such as ethyl aluminum sesquichloride, dialkyl aluminum monoalkoxides such as dimethyl aluminum methoxide, diethyl aluminum ethoxide, diethyl aluminum phenoxide, dipropyl aluminum ethoxide, diisobutyl aluminum ethoxide, and diisobutyl aluminum phenoxide, and dialkyl aluminum hydrides such as dimethyl aluminum hydride, diethyl aluminum hydride, dipropyl aluminum hydride, and diisobutyl aluminum hydride. Among other organic aluminum compounds enumerated above, trialkyl aluminums, specifically triethyl aluminum, triisobutyl aluminum prove particularly desirable. Such as trialkyl aluminum can be used in combination with other organic aluminum compounds such as diethyl aluminum chloride, ethyl aluminum dichloride, ethyll aluminum sesquichloride, diethyl aluminum ethoxide, or diethyl aluminum hydride which is easily available commercially. These other organic aluminum compounds may be used in the form of a mixture or complex compound.

Further, an organic aluminum compound having two or more aluminum atoms linked through the medium of an oxygen atom or nitrogen atom is also usable. Concrete examples of this organic aluminum compound are $(C_2H_5)_2AlOAl(C_2H_5)_2$, $(C_4H_9)_2AlOAl(C_4H_9)_2$, and

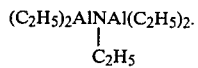

Examples of organic compounds of metals other than aluminum are diethyl magnesium, ethyl magnesium chloride, diethyl zinc and such compounds as LiAl(C$_2$H$_5$)$_4$ and LiAl(C$_7$H$_{15}$)$_4$.

The organic metal compound may be used independently or in combination with an electron-donating compound. This electron-donating compound may be any of the compounds which are usable when necessary in the preparation of the catalyst component described above. Besides, organic silicon compounds capable of serving as electron-donating compounds and electron-donating compounds containing hetero atoms such as nitrogen, sulfur, oxygen, and phosphorus atoms are also usable.

Concrete examples of organic silicon compounds are tetramethoxy silane, tetraethoxy silane, tetrabutoxy silane, tetraisobutoxy silane, tetraphenoxy silane, tetra(p-methylphenoxy) silane, tetrabenzyloxy silane, methyl trimethoxy silane, methyl triethoxy silane, methyl tributoxy silane, methyl triphenoxy silane, ethyl triethoxy silane, ethyl triisobutoxy silane, ethyl triphenoxy silane, butyl trimethoxy silane, butyl triethoxy silane, butyl triphenoxy silane, isobutyl triisobutoxy silane, vinyl triethoxy silane, allyl trimethoxy silane, phenyl trimethoxy silane, phenyl triethoxy silane, benzyl triphenoxy silane, methyl triallyloxy silane, dimethyl dimethoxy silane, dimethyl diethoxy silane, dimethyl diisopropoxy silane, dimethyl dibutoxy silane, dimethyl dihexyloxy silane, dimethyl diphenoxy silane, diethyl diethoxy silane, diethyl diisobutoxy silane, diethyl diphenoxy silane, dibutyl diisopropoxy silane, dibutyl dibutoxy silane, dibutyl diphenoxy silane, diisobutyl diethoxy silane, diisobutyl diisobutoxy silane, diphenyl dimethoxy silane, diphenyl diethoxy silane, diphenyl dibutoxy silane, dibenzyl diethoxy silane, divinyl diphenoxy silane, diallyl dipropoxy silane, diphenyl diallyloxy silane, methylphenyl dimethoxy silane, and chlorophenyl diethoxy silane.

Concrete examples of the electron-donating compound containing a hetero atom are such nitrogen atom-containing compounds as 2,2,6,6-tetramethyl piperidine, 2,6-dimethyl piperidine, 2,6-diethyl piperidine, 2,6-diisopropyl piperidine, 2,2,5,5-tetramethyl pyrrolidine, 2,5-dimethyl pyrrolidine, 2,5-diethyl pyrrolidine, 2,5-diisopropyl pyrrolidine, 2-methyl pyridine, 3-methyl pyridine, 4-methyl pyridine, 1,2,4-trimethyl piperidine, 2,5-dimethyl piperidine, methyl nicotinate, ethyl nicotinate, nicotinic acid amide, benzoic acid amide, 2-methyl pyrrole, 2,5-dimethyl pyrrole, imidazole, toluic acid amide, benzonitrile, acetonitrile, aniline, para-toluidine, orthotoluidine, meta-toluidine, triethyl amine, diethyl amine, dibutyl amine, tetramethylene diamine, and tributyl amine, such sulfur atom-containing compounds as thiophenol, thiophene, ethyl 2-thiophene carboxylate, ethyl 3-thiophene carboxylate, 2-methyl thiophene, methyl mercaptan, ethyl mercaptan, isopropyl mercaptan, butyl mercaptan, diethyl thioether, methyl benzenesulfonate, methyl sulfite, and ethyl sulfite, such oxygen atom-containing compounds as tetrahydrofuran, 2-methyl tetrahydrofuran, 3-methyl tetrahydrofuran, dioxane, dimethyl ether, diethyl ether, dibutyl ether, diisoamyl ether, diphenyl ether, anisole, acetophenone, acetone, methylethyl ketone, acetyl acetone, ethyl 2-furalate, isoamyl 2-furalate, methyl 2-furalate, and propyl 2-furalate, and such phosphorus atom-containing compounds as triphenyl phosphine, tributyl phosphine, triphenyl phosphite, tribenzyl phosphite, diethyl phosphate, and diphenyl phosphate.

These electron-donating compounds are such that two or more members selected from the group of compounds enumerated above can be used as a mixture. The electron-donating compound may be used at the same time that the organic metal compound is used in combination with the catalyst component or it may be used after it has been placed in contact with the organic metal compound.

The amount of the organic metal compound to be used relative to the catalyst component of the present invention falls generally in the range of 1 to 2000 gram mols, preferably 20 to 500 gram mols, per gram atom of titanium present in the catalyst component.

The proportions of the organic metal compound and the electron-donating compound are such that the amount of the organic metal compound falls in the range of 0.1 to 40 gram atoms, preferably 1 to 25 gram atoms, per mol of the electron-donating compound.

Polymerization of Olefins

The catalyst which comprises the catalyst component obtained as described above and the organic metal compound (and the electron-donating compound) is useful for catalyzing homopolymerization of a monoolefin or copolymerization of the monoolefin in combination with other monoolefins or diolefins. The catalyst exhibits an outstanding function, particularly in catalyzing homopolymerization of ethylene or random or block copolymerization of ethylene with an alpha-olefin of 3 to 10 carbon atoms such as, for example, propylene, 1-butene, 4-methyl-1-pentene, 1-hexene, or 1-octene, and particularly homopolymerization of an alpha-olefin, especially an alpha-olefin of 3 to 6 carbon atoms such as, for example, propylene, 1-butene, 4-methyl-1-pentene, or 1-hexene, copolymerization of two such alpha-olefins as mentioned above, and/or random or block copolymerization of such an alpha-olefin as mentioned above with ethylene.

The polymerization may be carried out in either the gaseous phase or the liquid phase. When the polymerization is performed in the liquid phase, it can be effected on a liquid monomer in an inactive hydrocarbon such as normal butane, iso-butane, normal pentane, iso-pentane, hexane, heptane, octane, cyclohexane, benzene, toluene, or xylene. The polymerization temperature falls generally in the range of −80° C. to +150° C., preferably in the range of 40° C. to 120° C. The polymerization pressure is sufficient in the range of 1 to 60 atmospheres. Adjustment of the molecular weight of the polymer to be obtained is attained by causing the polymerization to proceed in the presence of hydrogen or other known molecular weight adjusting agent. The amount of the other olefin with which the olefin is copolymerized generally is not allowed to exceed 30% by weight and preferably is selected in the range of 0.3 to 15% by weight. The polymerization by the catalyst system of this invention can be carried out continuously or batchwise under those conditions which are generally adopted for the purpose of polymerization. The copolymerization may be performed in one step or in two or more split steps.

Effect of the Invention

The catalyst component of the present invention functions effectively particularly in the production of high-density polyethylene and copolymers of ethylene and alpha-olefins such as propylene, 1-butene, 4-methyl-1-pentene, 1-hexene, and 1-octene.

The polymerization catalyst using the catalyst component of the present invention possesses high polymerization activity and the (co)polymer obtained by the use of the polymerization catalyst possesses high bulk density and has particle diameters distributed in a narrow range. Even when the amount of hydrogen used generally as a molecular weight adjusting agent during the polymerization is decreased, the produced polymer possesses a high melt index. Further, the polymerization effected by the use of this polymerization catalyst entails only minimal formation of low molecular polymers soluble in such hydrocarbons as hexane.

EXAMPLE

Now, the present invention will be described more specifically below with reference to the examples and applied examples. The percents (%) mentioned in the examples and the applied examples are percents by weight unless otherwise specified.

The melt index (MI) and the melt flow rate (MFR) of polymer represent the values determined in accordance with ASTM D-1238. The bulk density represents the value determined by the method as defined in ASTM D-1895-69. The heptane insolubles content (HI) which shows the proportion of crystalline polymer to the whole of a given polymer represents the residue after six hours' extraction of the polymer with boiling n-heptane in an improved version of the Soxhlet extractor.

EXAMPLE 1

Contact of Silicon Oxide with n-butylethyl Magnesium

A flask having an inner volume of 200 ml and provided with a stirrer had its interior air displaced with nitrogen gas. In the flask, 5 g of silicon oxide (SiO$_2$)(product of Davison Corp. having a specific surface area of 302 m$^2$/g, a pore volume of 1.54 cm$^3$/g, and an average pore radius of 204 A and marketed under trademark designation of G-952) fired under a flow of nitrogen gas at 200° C. for two hours and further at 700° C. for five hours and 20 ml of 20% n-heptane solution of n-butylethyl magnesium (hereinafter referred to as "BEM") (26.8 mmol as BEM) (the solution being a product of Texas Alkyls Corporation, marketed under trademark designation of MAGALA ® BEM) added thereto were stirred at 90° C. for one hour. The supernatant consequently formed was removed by decantation and the solid was washed three times with 50 ml of n-hexane at 50° C.

The solid substance obtained in the foregoing procedure and 50 ml of n-hexane and 20 ml of ortho-ethyl formate added thereto were stirred for reaction at 90° C. for one hour. The supernatant formed was removed and discarded. The solid substance which remained was washed three times with 50 ml of n-hexane at 50° C.

The solid substance obtained as described above and 50 ml of toluene and 0.5 ml of titanium tetrachloride added thereto were stirred for reaction at 90° C. for two hours. The supernatant was discarded and the remaining solid substance was washed five times with 100 ml of n-hexane. The washed solid substance was dried under a vacuum at 65° C. for one hour. Consequently, there was obtained 6.3 g of a catalyst component. This catalyst component was found to have a specific surface area of 242 m$^2$/g and a pore volume of 0.937 cm$^3$/g. This catalyst component was found to contain 3.8% of magnesium, 4.2% of titanium, 12.5% of chlorine, and 38.8% of SiO$_2$.

EXAMPLES 2 and 3

By following the procedure of Example 1, except using orthomethyl formate (Example 2) or orthomethyl carbonate (Example 3) in the place of orthoethyl formate, there were prepared catalysts components having titanium contents of 4.5% (Example 2) and 5.9% (Example 3).

EXAMPLE 4

By following the procedure of Example 1, except using n-butyl magnesium chloride in the place of BEM, there was prepared a catalyst component having a titanium content of 3.0%.

EXAMPLE 5

By following the procedure of Example 4 except using orthomethyl acetate in the place of ortho-ethyl formate there was prepared a catalyst component having a titanium content of 2.9%.

EXAMPLE 6

By following the procedure of Example 1, except using Al$_2$O$_3$ fired under the same conditions as in Example 1 in the place of SiO$_2$, there was prepared a catalyst component having a titanium content of 1.9%.

EXAMPLE 7

The washed solid substance obtained by the contact with ortho-ethyl formate in the procedure of Example 1 and 50 ml of n-heptane and 20 ml of silicon tetrachloride added thereto were stirred for reaction at 50° C. for one hour. The supernatant was discarded and the remaining solid substance was washed three times with 50 ml of n-hexane at 50° C. The solid substance consequently obtained was held in contact with titanium tetrachloride in the same way as in Example 1. Consequently, there was prepared a catalyst component having a titanium content of 2.2%.

EXAMPLES 8–10

Three catalyst components of varying quality were prepared following the procedure of Example 7, except using various compounds (E component) in the place of silicon tetrachloride and varying the time of treatment as indicated below in Table I.

TABLE I

| Example | E Component/ medium | Amount used (ml) | Temperature of Treatment (°C.) | Titanium Content (%) |
|---|---|---|---|---|
| 8 | Trichlorosilane/ n-heptane | 20/50 | 70 | 0.53 |
| 9 | Diisobutyl phthlate/ toluene | 0.4/40 | 70 | 1.4 |
| 10 | Diethyl aluminum chloride/toluene (solution of 0.25 mmol/ml) | 60 | 50 | 2.5 |

COMPARATIVE EXPERIMENT 1 ments 1–3 instead. The results are shown in the following Table II.

TABLE II

| Applied Example | Catalyst component | Ec (g/g. Cat. hr. atm) | Et (kg/g. Ti. hr. atm) | Bulk density (g/cm$^3$) | MI (g/10 min.) | True density (g/cm$^3$) |
|---|---|---|---|---|---|---|
| Example | | | | | | |
| 1 | 1 | 294 | 7.08 | 0.40 | 1.23 | 0.9277 |
| 2 | 2 | 344 | 7.58 | 0.42 | 0.68 | 0.9275 |
| 3 | 3 | 358 | 6.12 | 0.39 | 1.30 | 0.9281 |
| 4 | 4 | 165 | 5.55 | 0.39 | 0.97 | 0.9290 |
| 5 | 5 | 232 | 7.89 | 0.34 | 0.76 | 0.9234 |
| 6 | 6 | 23.5 | 1.22 | 0.26 | 0.14 | 0.9367 |
| 7 | 7 | 321 | 14.7 | 0.39 | 2.19 | 0.9287 |
| 8 | 8 | 156 | 29.3 | 0.44 | 0.84 | 0.9275 |
| 9 | 10 | 127 | 5.13 | 0.31 | 2.39 | 0.910 |
| Comparative experiment | | | | | | |
| 10 | 1 | 285 | 2.83 | 0.28 | 0.28 | 0.9263 |
| 11 | 2 | 279 | 6.08 | 0.37 | 1.63 | 0.9288 |
| 12 | 3 | 268 | 5.18 | 0.36 | 1.13 | 0.9260 |

By following the procedure of Example 1, except omitting the contact with ortho-ethyl formate, there was prepared a catalyst component having a titanium content of 10.1%.

COMPARATIVE EXPERIMENTS 2 and 3

By following the procedure of Example 1, except 20 ml of tetraethoxy silane (Comparative Experiment 2) or 20 ml of ethanol (Comparative Experiment 3) in the place of ortho-ethyl formate, there were prepared catalyst components having titanium contents of 4.6% (Comparative Experiment 2) and 5.2% (Comparative Experiment 3).

APPLIED EXAMPLE 1

Copolymerization of Ethylene and 1-Butene

In an autoclave having an inner volume of 1.5 liters and provided with a stirrer, 77.5 mg of the catalyst component obtained in Example 1, 0.7 mmol of triisobutyl aluminum, and 700 ml of isobutane were placed under a blanket of nitrogen gas. The polymerization system so prepared was heated to 80° C. Then hydrogen was introduced therein until the partial pressure of hydrogen reached 1.5 kg/cm$^2$ and ethylene was subsequently introduced therein until the partial pressure reached 5 kg/cm$^2$ and 30 g of 1-butene was added thereto. Polymerization of the monomers was carried out for two hours while ethylene was continuously supplied in such a manner as to retain the total pressure of the polymerization system constant. After completion of the polymerization, the medium and the unaltered ethylene and 1-butene were purged to permit withdrawal of a white powdery polymer. The polymer was dried under a vacuum at 70° C. for 10 hours. Consequently, there was obtained 228.1 g of an ethylene-1-butene copolymer having a MI of 1.23 g/10 min., a bulk density of 0.40 g/cm$^3$, and a true density of 0.9277 g/cm$^3$. The specific catalyst activity, Ec, was found to be 294 g/g catalyst component hour monomer partial pressure and Et to be 7.08 kg/g titanium hour monomer partial pressure.

APPLIED EXAMPLES 2–12

Copolymerization of ethylene and 1-butene was carried out by following the procedure of Applied Example 1, except using the catalyst components obtained in Examples 2–8, Example 10, and Comparative Experi-

APPLIED EXAMPLE 13

Polymerization of Ethylene

Polymerization of ethylene was carried out by following the procedure of Applied Example 1, except changing the amount of the catalyst component obtained in Example 1 to 65.2 mg, the partial pressure of hydrogen to 2.0 kg/cm$^2$, and the polymerization time to 10 hours and omitting the use of 1-butene. Consequently, there was obtained 24.0 g of polyethylene powder having a bulk density of 0.38 g/cm$^3$ and a MI of 0.27 g/10 min (Ec=73.6 g/g cat hr atm and Et=1.77 kg/g Ti hr atm).

APPLIED EXAMPLE 14

Polymerization of ethylene was carried out by following the procedure of Applied Example 13, except using the catalyst component obtained in Comparative Experiment 1 instead. Consequently, there was obtained polyethylene powder having a bulk density of 0.31 g/cm$^3$ and a MI of 0.22 g/10 min (Ec was found to be 133 g/g/ cat hr atm and Et to be 1.32 kg/g Ti hr atm.)

APPLIED EXAMPLE 15

Polymerization of Propylene

In the autoclave having an inner volume of 1.5 liters and provided with a stirrer, a reaction mixture obtained by mixing 50.1 mg of the catalyst component obtained in Example 1, such an amount of n-heptane solution of triethyl aluminum (TEAL) (1 mol/liter) that the amount of aluminum per gram atom of titanium in the catalyst composition equaled 200 gram atoms, and such an amount of a n-heptane solution of phenyl triethoxy silane (PES) (0.1 mol/liter) that the amount of PES per gram atom of aluminum in the TEAL solution equaled 0.1 gram mol and retaining the resultant mixture for five minutes was placed under a blanket of nitrogen gas. Then 0.1 liter of hydrogen gas as a molecular weight adjusting agent and 1 liter of liquefied propylene were introduced under pressure. The reaction system so formed was heated to 70° C. and held at that temperature for polymerization of propylene for one hour. After completion of the polymerization, the unaltered propylene was purged. Consequently, there was obtained 89.7 g of a white polypropylene powder having a HI of 93.2% and a MFR of 5.7 g/10 min [Kc (amount of polymer, g, formed per g of the catalyst component)=1,790 and Kt (amount of polymer, kg, formed per g of titanium in the catalyst component)=43].

APPLIED EXAMPLES 16 and 17

Polymerization of propylene was carried out by followidg the procedure of Applied Example 15, except using the catalyst components obtained in Example 9 and Comparative Experiment 1. The results are shown in Table III.

TABLE III

| Applied Example | Catalyst Component | Kc (g/g.cat) | Kt (kg/g.Ti) | HI (%) | MFR (g/10 min) |
|---|---|---|---|---|---|
| 15 | Example 1 | 1,790 | 43 | 93.2 | 5.7 |
| 16 | Example 9 | 780 | 56 | 98.0 | 6.2 |
| 17 | Comparative Experiment 1 | 1,946 | 19 | 89.4 | 5.4 |

What is claimed is:

1. A titanium containing supported catalyst component comprising the product obtained by contacting
   (1) a reaction product comprising
       (a) a metal oxide or a composite of metal oxides of Group II, III, or IV of the Periodic Table,
       (b) a magnesium compound represented by the formula RMgR', mixtures thereof, or a complex with an organic compound of aluminum, boron, beryllium, or zinc, wherein R represents a hydrocarbyl group having from 1 to 20 carbon atoms and R' represents a hydroxarbyl group having from 1 to 20 carbon atoms or a halogen atom, and
       (c) a alkoxy group-containing organic compound represented by the formula $X_mC(OR)_{4-m}$ wherein X denotes a hydrogen atom, a halogen atom, or a hydrocarbyl group selected from alkyl, cycloalkyl, aryl or aralkyl groups having from 1 to 20 carbon atoms or a halogen substituted hydrocarhyl group, R denotes a hydrocarbyl group selected from alkyl, cycloalkyl, aryl or aralkyl groups having from 1 to 20 carbon atoms and m is selected from 0, 1 or 2, with
   (2) (d) a di-, tri-, or tetravalent titanium compound.

2. The titanium containing supported catalyst component of claim 1 wherein the metal oxide is selected from the group consisting of $B_2O_3$, MgO, $Al_2O_3$, $SiO_2$, CaO, $TiO_2$, ZnO, $ZrO_2$, $SnO_2$, $BaO_2$ or $ThO_2$.

3. The titanium containing supported catalyst component of claim 2 wherein the metal oxide is $SiO_2$.

4. The titanium containing supported catalyst component of claim 1 wherein the magnesium compound is one of n-butyl ethylmagnesium or n-butyl magnesium chloride.

5. The titanium containing supported catalyst component of claim 1 wherein the titanium compound is selected from the group consisting of titanium tetrachloride, trichloroethoxy titanium, dichlorodibutoxy titanium and dichlorodiphenoxy titanium.

6. The titanium containing supported catalyst component of claim 5 wherein the titanium compound in titanium tetrachloride.

7. The titanium containing supported catalyst component of claim 1 wherein the reaction product is contacted with one of a halogen-containing compound, electron-donating compound, an organic aluminum compound or mixtures thereof prior to or subsequently to the contact of the reaction product with the titanium compound.

8. The titanium containing supported catalyst component of claim 4 wherein the reaction product is contacted with $SiCl_4$.

9. The titanium containing supported catalyst component of claim 1 wherein the alkoxy group-containing compound is selected from the group consisting of ortho-ethyl formate, ortho-methyl formate, ortho-methyl carbonate, or ortho-methyl acetate.

10. A catalyst system for the polymerization of olefins comprising
    (A) the titanium containing supported catalyst component of claim 1, and
    (B) an organometallic compound of Group I through III.

11. A catalyst system for the polymerization of olefins comprising
    (A) the titanium containing supported catalyst component of claim 9, and
    (B) an organometallic compound of Group I through III.

* * * * *